(12) United States Patent
Cho et al.

(10) Patent No.: US 9,651,117 B2
(45) Date of Patent: May 16, 2017

(54) PLANETARY GEAR TRAIN OF AUTOMATIC TRANSMISSION FOR VEHICLE

(71) Applicant: Hyundai Motor Company, Seoul (KR)

(72) Inventors: Wonmin Cho, Hwaseong-si (KR); Seong Wook Hwang, Gunpo-si (KR); Woochurl Son, Seongnam-si (KR); Hyun Sik Kwon, Seoul (KR); Jae Chang Kook, Hwaseong-si (KR); Seongwook Ji, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/948,080

(22) Filed: Nov. 20, 2015

(65) Prior Publication Data

US 2017/0074367 A1    Mar. 16, 2017

(30) Foreign Application Priority Data

Sep. 14, 2015   (KR) .......................... 10-2015-0129859

(51) Int. Cl.
*F16H 3/66*   (2006.01)

(52) U.S. Cl.
CPC ......... *F16H 3/66* (2013.01); *F16H 2200/006* (2013.01); *F16H 2200/201* (2013.01); *F16H 2200/2046* (2013.01)

(58) Field of Classification Search
None
See application file for complete search history.

(56) References Cited

U.S. PATENT DOCUMENTS

| 2009/0054198 | A1* | 2/2009 | Phillips | F16H 3/66 475/277 |
| 2011/0009229 | A1* | 1/2011 | Bauknecht | F16H 3/66 475/275 |
| 2012/0122625 | A1* | 5/2012 | Shim | F16H 3/66 475/275 |
| 2014/0128210 | A1* | 5/2014 | Noh | F16H 3/666 475/311 |
| 2014/0371025 | A1 | 12/2014 | Oita et al. | |

FOREIGN PATENT DOCUMENTS

KR    10-2012-0121158 A    11/2012

* cited by examiner

*Primary Examiner* — Edwin A Young
(74) *Attorney, Agent, or Firm* — Morgan Lewis & Bockius LLP

(57) ABSTRACT

A planetary gear train of an automatic transmission for a vehicle may include an input shaft receiving power from an engine, an output shaft configured to output power changed in speed, a first planetary gear set including first, second, and third rotating elements, a second planetary gear set including fourth, fifth, and sixth rotating elements, a third planetary gear set including seventh, eighth, and ninth rotating element, and six control elements which are disposed at positions where the rotating elements are selectively connected to each other.

10 Claims, 2 Drawing Sheets

FIG. 2

|     | C1 | C2 | C3 | C4 | C5 | C6 | Gear ratio |
|-----|----|----|----|----|----|----|------------|
| D1  | O  |    | O  |    |    | O  | 3.400      |
| D2  | O  |    |    |    | O  | O  | 1.789      |
| D3  | O  |    |    | O  |    | O  | 1.393      |
| D4  | O  | O  |    |    |    | O  | 1.000      |
| D5  |    | O  |    | O  |    | O  | 0.836      |
| D6  |    | O  |    |    | O  | O  | 0.671      |
| D7  |    | O  |    | O  | O  |    | 0.600      |
| D8  | O  | O  |    |    | O  |    | 0.560      |
| REV | O  |    | O  |    | O  |    | 5.667      |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0129859 filed Sep. 14, 2015, the entire contents of which is incorporated herein for all purposes by this reference.

BACKGROUND OF THE INVENTION

Field of the Invention

The present invention relates to an automatic transmission for a vehicle, and more particularly, to a planetary gear train of an automatic transmission for a vehicle, which is capable of improving fuel efficiency by implementing an automatic transmission with multiple stages and implementing eight forward speeds using a minimum number of configurations, and capable of improving constant-speed driving performance of the vehicle by ensuring an operating point within a low RPM region.

Description of Related Art

The recent increase in oil prices has pushed carmakers into unlimited competition for enhancing fuel efficiency.

Accordingly, research is being conducted on engines in terms of reducing weight and improving fuel efficiency by down-sizing, and research is also being conducted for simultaneously securing operability and fuel efficiency competitiveness by implementing an automatic transmission with multiple speed stages.

However, in the case of the automatic transmission, the number of internal components is increased as the number of gear shift stages is increased, and as a result, the automatic transmission may be difficult to mount, the manufacturing cost and weight may be increased, and power transmission efficiency may be deteriorated.

Therefore, in order to increase an effect of improving fuel efficiency by implementing an automatic transmission with multiple speed stages, it is important to develop a planetary gear train capable of maximizing efficiency using a small number of components.

In this respect, recently, an eight-speed automatic transmission has been applied to an actual vehicle, and researches and developments are being actively conducted on a planetary gear train that may implement gear shift stages for eight or more speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle, which is capable of improving fuel efficiency by implementing an automatic transmission with multiple stages and implementing gear shift stages for eight forward speeds and one reverse speed using a minimum number of configurations, and capable of improving constant-speed driving performance of the vehicle by ensuring an operating point within a low RPM region.

According to various aspects of the present invention, a planetary gear train of an automatic transmission for a vehicle may include an input shaft receiving power from an engine, an output shaft configured to output power changed in speed, a first planetary gear set including first, second, and third rotating elements, a second planetary gear set including fourth, fifth, and sixth rotating elements, a third planetary gear set including seventh, eighth, and ninth rotating element, six control elements which are disposed at positions where the rotating elements are selectively connected to each other, a first rotating shaft which includes the first rotating element and the seventh rotating element, and is selectively connected with the input shaft, a second rotating shaft which includes the second rotating element and the sixth rotating element, and is selectively connected with the first rotating shaft, a third rotating shaft which includes the third rotating element, a fourth rotating shaft which includes the fourth rotating element, and is directly connected with a transmission housing, a fifth rotating shaft which includes the fifth rotating element, and is selectively connected to the input shaft or the fourth rotating shaft, a sixth rotating shaft which includes the eighth rotating element, and is directly connected with the output shaft, and a seventh rotating shaft which includes the ninth rotating element, and is selectively connected to the third rotating shaft or the fifth rotating shaft.

The first planetary gear set may be a single pinion planetary gear set in which the first rotating element is a first sun gear, the second rotating element is a first planet carrier, and the third rotating element is a first ring gear, the second planetary gear set may be a single pinion planetary gear set in which the fourth rotating element is a second sun gear, the fifth rotating element is a second planet carrier, and the sixth rotating element is a second ring gear, and the third planetary gear set may be a single pinion planetary gear set in which the seventh rotating element is a third sun gear, the eighth rotating element is a third planet carrier, and the ninth rotating element is a third ring gear.

The six control elements may include a first clutch selectively connecting the input shaft and the first rotating shaft, a second clutch selectively connecting the input shaft and the fifth rotating shaft, a third clutch selectively connecting the fourth rotating shaft and the fifth rotating shaft, a fourth clutch selectively connecting the first rotating shaft and the second rotating shaft, a fifth clutch selectively connecting the third rotating shaft and the seventh rotating shaft, and a sixth clutch selectively connecting the fifth rotating shaft and the seventh rotating shaft.

Gear shift stages, which are implemented by selectively operating the six control elements may include a first forward gear shift stage which may be implemented by simultaneously operating the first, third, and sixth clutches, a second forward gear shift stage which may be implemented by simultaneously operating the first, fifth, and sixth clutches, a third forward gear shift stage which may be implemented by simultaneously operating the first, fourth, and sixth clutches, a fourth forward gear shift stage which may be implemented by simultaneously operating the first, second, and sixth clutches, a fifth forward gear shift stage which may be implemented by simultaneously operating the second, fourth, and sixth clutches, a sixth forward gear shift stage which may be implemented by simultaneously operating the second, fifth, and sixth clutches, a seventh forward gear shift stage which may be implemented by simultaneously operating the second, fourth, and fifth clutches, an eighth forward gear shift stage which may be implemented by simultaneously operating the first, second, and fifth clutches, and a reverse gear shift stage which may be implemented by simultaneously operating the first, third, and fifth clutches.

According to various aspects of the present invention, a planetary gear train of an automatic transmission for a vehicle may include an input shaft which receives power from an engine, an output shaft which outputs power changed in speed, a first planetary gear set which may be a single pinion planetary gear set, and has first, second, and third rotating elements, a second planetary gear set which may be a single pinion planetary gear set, and has fourth, fifth, and sixth rotating elements, a third planetary gear set which may be a single pinion planetary gear set, and has seventh, eighth, and ninth rotating elements, a first rotating shaft which includes the first rotating element and the seventh rotating element, and may be selectively connected with the input shaft, a second rotating shaft which includes the second rotating element and the sixth rotating element, and may be selectively connected with the first rotating shaft, a third rotating shaft which includes the third rotating element, a fourth rotating shaft which includes the fourth rotating element, and may be directly connected with a transmission housing, a fifth rotating shaft which includes the fifth rotating element, and may be selectively connected with the input shaft and the fourth rotating shaft, a sixth rotating shaft which includes the eighth rotating element, and may be directly connected with the output shaft, a seventh rotating shaft which includes the ninth rotating element, and may be selectively connected with the third rotating shaft and the fifth rotating shaft, a first clutch selectively connecting the input shaft and the first rotating shaft, a second clutch selectively connecting the input shaft and the fifth rotating shaft, a third clutch selectively connecting the fourth rotating shaft and the fifth rotating shaft, a fourth clutch selectively connecting the first rotating shaft and the second rotating shaft, a fifth clutch selectively connecting the third rotating shaft and the seventh rotating shaft, and a sixth clutch selectively connecting the fifth rotating shaft and the seventh rotating shaft.

In the first planetary gear set, the first rotating element may be a first sun gear, the second rotating element may be a first planet carrier, and the third rotating element may be a first ring gear, in the second planetary gear set, the fourth rotating element may be a second sun gear, the fifth rotating element may be a second planet carrier, and the sixth rotating element may be a second ring gear, and in the third planetary gear set, the seventh rotating element may be a third sun gear, the eighth rotating element may be a third planet carrier, and the ninth rotating element may be a third ring gear.

According to various aspects of the present invention, a planetary gear train of an automatic transmission for a vehicle may include an input shaft receiving power from an engine, an output shaft configured to output power changed in speed, a first planetary gear set which may be a single pinion planetary gear set, and has a first sun gear, a first planet carrier, and a first ring gear, a second planetary gear set which may be a single pinion planetary gear set, and has a second sun gear, a second planet carrier, and a second ring gear, a third planetary gear set which may be a single pinion planetary gear set, and has a third sun gear, a third planet carrier, and a third ring gear, a first rotating shaft which includes the first sun gear and the third sun gear, and may be selectively connected with the input shaft, a second rotating shaft which includes the first planet carrier and the second ring gear, and may be selectively connected with the first rotating shaft, a third rotating shaft which includes the first ring gear, a fourth rotating shaft which includes the second sun gear, and may be directly connected with a transmission housing, a fifth rotating shaft which includes the second planet carrier, and may be selectively connected with the input shaft and the fourth rotating shaft, a sixth rotating shaft which includes the third planet carrier, and may be directly connected with the output shaft, a seventh rotating shaft which includes the third ring gear, and may be selectively connected with the third rotating shaft and the fifth rotating shaft, and six control elements which are disposed at positions where the rotating shafts are selectively connected to each other.

The planetary gear train according to various embodiments of the present invention may implement the gear shift stages for eight forward speeds and one reverse speed by combining the three planetary gear sets, which are simple planetary gear sets, with the six control elements.

In addition, the planetary gear train according to various embodiments of the present invention may implement eight forward speeds by using the three planetary gear sets, thereby simplifying the configurations in the automatic transmission, and improving durability.

In addition, the planetary gear train according to various embodiments of the present invention may improve fuel efficiency by implementing an automatic transmission with multiple states, and improve constant-speed driving performance of the vehicle by ensuring an operating point within a low RPM region.

In addition, other effects obtained or expected by the various embodiments of the present invention will be directly or implicitly disclosed in the detailed description of the various embodiments of the present invention. That is, various effects expected according to various embodiments of the present invention will be disclosed in the detailed description to be described below.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table representing operations at respective gear shift stages implemented by respective control elements applied to the exemplary planetary gear train according to the present invention.

Figure 1:
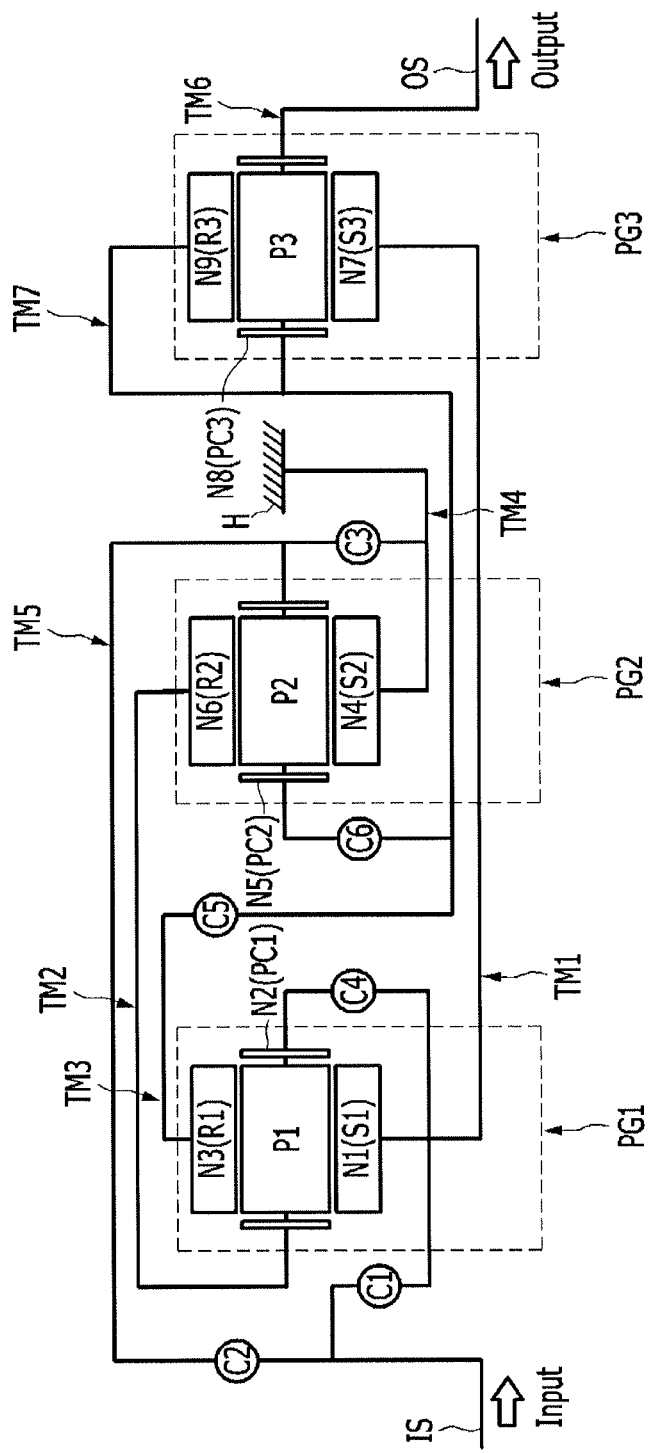
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of an exemplary planetary gear train according to the present invention.

Referring to FIG. 1, the planetary gear train according to various embodiments of the present invention includes first, second, and third planetary gear sets PG1, PG2, and PG3 which are coaxially disposed, an input shaft IS, an output shaft OS, seven rotating shafts TM1 to TM7 which directly connect respective rotating elements of the first, second, and third planetary gear sets PG1, PG2, and PG3 to each other, six control elements C1 to C6, and a transmission housing H.

Further, rotational power inputted from the input shaft IS is changed in speed by complementary operations of the first, second, and third planetary gear sets PG1, PG2, and PG3, and then outputted through the output shaft OS.

The respective simple planetary gear sets are disposed in the order of the first, second, and third planetary gear sets PG1, PG2, and PG3 from an engine side.

The input shaft IS is an input member, and rotational power from a crankshaft of the engine is converted into torque by a torque converter, and the torque is inputted.

The output shaft OS is an output member, and disposed coaxially with the input shaft IS, and transmits the driving torque, which is changed in speed, to a drive shaft through a differential apparatus.

The first planetary gear set PG1 is a single pinion planetary gear set, and includes rotating elements including a first sun gear S1 which is a first rotating element N1, a first planet carrier PC1 which is a second rotating element N2 and supports a first pinion P1 that externally engages with the first sun gear S1 which is the first rotating element N1, and a first ring gear R1 which is a third rotating element N3 and internally engages with the first pinion P1.

The second planetary gear set PG2 is a single pinion planetary gear set, and includes a second sun gear S2 which is a fourth rotating element N4, a second planet carrier PC2 which is a fifth rotating element N5 and supports a second pinion P2 that externally engages with the second sun gear S2 which is the fourth rotating element N4, and a second ring gear R2 which is a sixth rotating element N6 and internally engages with the second pinion P2.

The third planetary gear set PG3 is a single pinion planetary gear set, and includes a third sun gear S3 which is a seventh rotating element N7, a third planet carrier PC3 which is an eighth rotating element N8 and supports a third pinion P3 that externally engages with the third sun gear S3 which is the seventh rotating element N7, and a third ring gear R3 which is a ninth rotating element N9 and internally engages with the third pinion P3.

The first rotating element N1 is directly connected with the seventh rotating element N7, and the second rotating element N2 is directly connected with the sixth rotating element N6, such that the first, second, and third planetary gear sets PG1, PG2, and PG3 are operated while retaining the total of seven rotating shafts TM1 to TM7.

The configurations of the seven rotating shafts TM1 to TM7 will be described below.

The first rotating shaft TM1 includes the first rotating element N1 (the first sun gear S1) and the seventh rotating element N7 (the third sun gear S3), and is selectively connected with the input shaft IS.

The second rotating shaft TM2 includes the second rotating element N2 (the first planet carrier PC1) and the sixth rotating element N6 (the second ring gear R2), and is selectively connected with the first rotating shaft TM1.

The third rotating shaft TM3 includes the third rotating element N3 (the first ring gear R1).

The fourth rotating shaft TM4 includes the fourth rotating element N4 (the second sun gear S2), and is directly connected to the transmission housing H so as to be always operated as a fixed element.

The fifth rotating shaft TM5 includes the fifth rotating element N5 (the second planet carrier PC2), and is selectively connected to the input shaft IS and the fourth rotating shaft TM4.

The sixth rotating shaft TM6 includes the eighth rotating element N8 (the third planet carrier PC3), and is directly connected to the output shaft OS so as to be always operated as an output element.

The seventh rotating shaft TM7 includes the ninth rotating element N9 (the third ring gear R3), and is selectively connected with the third rotating shaft TM3 and the fifth rotating shaft TM5.

Further, six clutches C1, C2, C3, C4, C5, and C6, which are control elements, are disposed at portions where the respective rotating shafts of the rotating shafts TM1 to TM7 are selectively connected to each other.

Positions at which the six control elements C1 to C6 are disposed will be described below.

The first clutch C1 is disposed between the input shaft IS and the first rotating shaft TM1, and allows the input shaft IS and the first rotating shaft TM1 to be selectively integrated with each other.

The second clutch C2 is disposed between the input shaft IS and the fifth rotating shaft TM5, and allows the input shaft IS and the fifth rotating shaft TM5 to be selectively integrated with each other.

The third clutch C3 is interposed between the fourth rotating shaft TM4 and the fifth rotating shaft TM5, and allows the fourth rotating shaft TM4 and the fifth rotating shaft TM5 to be selectively integrated with each other.

The fourth clutch C4 is interposed between the first rotating shaft TM1 and the second rotating shaft TM2, and allows the first rotating shaft TM1 and the second rotating shaft TM2 to be selectively integrated with each other.

The fifth clutch C5 is interposed between the third rotating shaft TM3 and the seventh rotating shaft TM7, and allows the third rotating shaft TM3 and the seventh rotating shaft TM7 to be selectively integrated with each other.

The sixth clutch C6 is interposed between the fifth rotating shaft TM5 and the seventh rotating shaft TM7, and allows the fifth rotating shaft TM5 and the seventh rotating shaft TM7 to be selectively integrated with each other.

The respective control elements, which includes the first, second, third, fourth, fifth, and sixth clutches C1, C2, C3, C4, C5, and C6 as described above, may be a multi-plate hydraulic frictional coupling unit frictionally coupled by hydraulic pressure.

FIG. 2 is a table representing operations at respective gear shift stages implemented by the respective control elements applied to the planetary gear train according to various embodiments of the present invention.

As illustrated in FIG. 2, according to the planetary gear train according to various embodiments of the present invention, gear shift operations are carried out by operating the three control elements at respective gear shift stages.

At a gear shift stage D1 for a first forward speed, the first, third, and sixth clutches C1, C3, and C6 are simultaneously operated. Therefore, the input shaft IS is connected with the first rotating shaft TM1 by the operation of the first clutch C1, the fourth rotating shaft TM4 is connected with the fifth rotating shaft TM3 by the operation of the third clutch C3, and the fifth rotating shaft TM5 is connected with the seventh rotating shaft TM7 by the operation of the sixth clutch C6. Then, as the fourth rotating shaft TM4 is operated as a fixed element in a state in which power is inputted to the first rotating shaft TM1, the speed is changed to the first forward speed, and the power is outputted through the output shaft OS including the sixth rotating shaft TM6.

At a gear shift stage D2 for a second forward speed, the first, fifth, and sixth clutches C1, C5, and C6 are simultaneously operated. Therefore, the input shaft IS is connected with the first rotating shaft TM1 by the operation of the first clutch C1, the third rotating shaft TM3 is connected with the seventh rotating shaft TM7 by the operation of the fifth clutch C5, and the fifth rotating shaft TM5 is connected with the seventh rotating shaft TM7 by the operation of the sixth clutch C6. Then, as the fourth rotating shaft TM4 is operated as a fixed element in a state in which power is inputted to the first rotating shaft TM1, the speed is changed to the second forward speed, and the power is outputted through the output shaft OS including the sixth rotating shaft TM6.

At a gear shift stage D3 for a third forward speed, the first, fourth, and sixth clutches C1, C4, and C6 are simultaneously operated. Therefore, the input shaft IS is connected with the first rotating shaft TM1 by the operation of the first clutch C1, the first rotating shaft TM1 is connected with the second rotating shaft TM2 by the operation of the fourth clutch C4, and the fifth rotating shaft TM5 is connected with the seventh rotating shaft TM7 by the operation of the sixth clutch C6. Then, as the fourth rotating shaft TM4 is operated as a fixed element in a state in which power is inputted to the first rotating shaft TM1, the speed is changed to the third forward speed, and the power is outputted through the output shaft OS including the sixth rotating shaft TM6.

At a gear shift stage D4 for a fourth forward speed, the first, second, and sixth clutches C1, C2, and C6 are simultaneously operated. Therefore, the input shaft IS is connected with the first rotating shaft TM1 by the operation of the first clutch C1, the input shaft IS is connected with the fifth rotating shaft TM5 by the operation of the second clutch C2, and the fifth rotating shaft TM5 is connected with the seventh rotating shaft TM7 by the operation of the sixth clutch C6. Then, as the fourth rotating shaft TM4 is operated as a fixed element in a state in which power is inputted to the first rotating shaft TM1 and the fifth rotating shaft TM5, the speed is changed to the fourth forward speed, and the power is outputted through the output shaft OS including the sixth rotating shaft TM6.

At a gear shift stage D5 for a fifth forward speed, the second, fourth, and sixth clutches C2, C4, and C6 are simultaneously operated. Therefore, the input shaft IS is connected the fifth rotating shaft TM5 by the operation of the second clutch C2, the first rotating shaft TM1 is connected with the second rotating shaft TM2 by the operation of the fourth clutch C4, and the fifth rotating shaft TM5 is connected with the seventh rotating shaft TM7 by the operation of the sixth clutch C6. Then, as the fourth rotating shaft TM4 is operated as a fixed element in a state in which power is inputted to the fifth rotating shaft TM5, the speed is changed to the fifth forward speed, and the power is outputted through the output shaft OS including the sixth rotating shaft TM6.

At a gear shift stage D6 for a sixth forward speed, the second, fifth, and sixth clutches C2, C5, and C6 are simultaneously operated. Therefore, the input shaft IS is connected with the fifth rotating shaft TM5 by the operation of the second clutch C2, the third rotating shaft TM3 is connected with the seventh rotating shaft TM7 by the operation of the fifth clutch C5, and the fifth rotating shaft TM5 is connected with the seventh rotating shaft TM7 by the operation of the sixth clutch C6. Then, as the fourth rotating shaft TM4 is operated as a fixed element in a state in which power is inputted to the fifth rotating shaft TM5, the speed is changed to the sixth forward speed, and the power is outputted through the output shaft OS including the sixth rotating shaft TM6.

At a gear shift stage D7 for a seventh forward speed, the second, fourth, and fifth clutches C2, C4, and C5 are simultaneously operated. Therefore, the input shaft IS is connected with the fifth rotating shaft TM5 by the operation of the second clutch C2, the first rotating shaft TM1 is connected with the second rotating shaft TM2 by the operation of the fourth clutch C4, and the third rotating shaft TM3 is connected with the seventh rotating shaft TM7 by the operation of the fifth clutch C5. Then, as the fourth rotating shaft TM4 is operated as a fixed element in a state in which power is inputted to the fifth rotating shaft TM5, the speed is changed to the seventh forward speed, and the power is outputted through the output shaft OS including the sixth rotating shaft TM6.

At a gear shift stage D8 for an eighth forward speed, the first, second, and fifth clutches C1, C2, and C5 are simultaneously operated. Therefore, the input shaft IS is connected with the first rotating shaft TM1 by the operation of the first clutch C1, the input shaft IS is connected with the fifth rotating shaft TM5 by the operation of the second clutch C2, and the third rotating shaft TM3 is connected with the seventh rotating shaft TM7 by the operation of the fifth clutch C5. Then, as the fourth rotating shaft TM4 is operated as a fixed element in a state in which power is inputted to the first rotating shaft TM1 and the fifth rotating shaft TM5, the speed is changed to the eighth forward speed, and the power is outputted through the output shaft OS including the sixth rotating shaft TM6.

At a reverse gear shift stage (REV), the first, third, and fifth clutches C1, C3, and C5 are simultaneously operated. Therefore, the input shaft IS is connected with the first rotating shaft TM1 by the operation of the first clutch C1, the fourth rotating shaft TM4 is connected with the fifth rotating shaft TM3 by the operation of the third clutch C3, and the third rotating shaft TM3 is connected with the seventh rotating shaft TM7 by the operation of the fifth clutch C5. Then, as the fourth rotating shaft TM4 is operated as a fixed element in a state in which power is inputted to the first rotating shaft TM1, a reverse gear shift operation is carried out, and the power is outputted through the output shaft OS including the sixth rotating shaft TM6.

As described above, the planetary gear train according to various embodiments of the present invention may implement the gear shift stages for eight forward speeds and one reverse speed by operating and controlling the three planetary gear sets PG1, PG2, and PG3 using the six clutches C1, C2, C3, C4, C5, and C6.

In addition, the planetary gear train according to various embodiments of the present invention may implement eight forward speeds by using the three planetary gear sets PG1, PG2, and PG3, thereby simplifying the configurations in the automatic transmission, and improving durability.

In addition, the planetary gear train according to various embodiments of the present invention may improve fuel efficiency by implementing an automatic transmission with multiple states, and improve constant-speed driving performance of the vehicle by ensuring an operating point within a low RPM region.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, the planetary gear train comprising:
    an input shaft receiving power from an engine;
    an output shaft configured to output power changed in speed;
    a first planetary gear set including first, second, and third rotating elements;
    a second planetary gear set including fourth, fifth, and sixth rotating elements;
    a third planetary gear set including seventh, eighth, and ninth rotating elements;
    six control elements which are disposed at positions where the rotating elements are selectively connected to each other;
    a first rotating shaft which includes the first rotating element and the seventh rotating element, and is selectively connected with the input shaft;
    a second rotating shaft which includes the second rotating element and the sixth rotating element, and is selectively connected with the first rotating shaft;
    a third rotating shaft which includes the third rotating element;
    a fourth rotating shaft which includes the fourth rotating element, and is directly connected with a transmission housing;
    a fifth rotating shaft which includes the fifth rotating element, and is selectively connected to the input shaft or the fourth rotating shaft;
    a sixth rotating shaft which includes the eighth rotating element, and is directly connected with the output shaft; and
    a seventh rotating shaft which includes the ninth rotating element, and is selectively connected to the third rotating shaft or the fifth rotating shaft.

2. The planetary gear train of claim 1, wherein:
    the first planetary gear set is a single pinion planetary gear set in which the first rotating element is a first sun gear, the second rotating element is a first planet carrier, and the third rotating element is a first ring gear,
    the second planetary gear set is a single pinion planetary gear set in which the fourth rotating element is a second sun gear, the fifth rotating element is a second planet carrier, and the sixth rotating element is a second ring gear, and
    the third planetary gear set is a single pinion planetary gear set in which the seventh rotating element is a third sun gear, the eighth rotating element is a third planet carrier, and the ninth rotating element is a third ring gear.

3. The planetary gear train of claim 1, wherein the six control elements include:
    a first clutch selectively connecting the input shaft and the first rotating shaft;
    a second clutch selectively connecting the input shaft and the fifth rotating shaft;
    a third clutch selectively connecting the fourth rotating shaft and the fifth rotating shaft;
    a fourth clutch selectively connecting the first rotating shaft and the second rotating shaft;
    a fifth clutch selectively connecting the third rotating shaft and the seventh rotating shaft; and
    a sixth clutch selectively connecting the fifth rotating shaft and the seventh rotating shaft.

4. The planetary gear train of claim 3, wherein:
    gear shift stages, which are implemented by selectively operating the six control elements, include:
    a first forward gear shift stage which is implemented by simultaneously operating the first, third, and sixth clutches;
    a second forward gear shift stage which is implemented by simultaneously operating the first, fifth, and sixth clutches;
    a third forward gear shift stage which is implemented by simultaneously operating the first, fourth, and sixth clutches;
    a fourth forward gear shift stage which is implemented by simultaneously operating the first, second, and sixth clutches;
    a fifth forward gear shift stage which is implemented by simultaneously operating the second, fourth, and sixth clutches;
    a sixth forward gear shift stage which is implemented by simultaneously operating the second, fifth, and sixth clutches;
    a seventh forward gear shift stage which is implemented by simultaneously operating the second, fourth, and fifth clutches;
    an eighth forward gear shift stage which is implemented by simultaneously operating the first, second, and fifth clutches; and
    a reverse gear shift stage which is implemented by simultaneously operating the first, third, and fifth clutches.

5. A planetary gear train of an automatic transmission for a vehicle, the planetary gear train comprising:
    an input shaft which receives power from an engine;
    an output shaft which outputs power changed in speed;
    a first planetary gear set which is a single pinion planetary gear set, and has first, second, and third rotating elements;

a second planetary gear set which is a single pinion planetary gear set, and has fourth, fifth, and sixth rotating elements;
a third planetary gear set which is a single pinion planetary gear set, and has seventh, eighth, and ninth rotating elements;
a first rotating shaft which includes the first rotating element and the seventh rotating element, and is selectively connected with the input shaft;
a second rotating shaft which includes the second rotating element and the sixth rotating element, and is selectively connected with the first rotating shaft;
a third rotating shaft which includes the third rotating element;
a fourth rotating shaft which includes the fourth rotating element, and is directly connected with a transmission housing;
a fifth rotating shaft which includes the fifth rotating element, and is selectively connected with the input shaft and the fourth rotating shaft;
a sixth rotating shaft which includes the eighth rotating element, and is directly connected with the output shaft;
a seventh rotating shaft which includes the ninth rotating element, and is selectively connected with the third rotating shaft and the fifth rotating shaft;
a first clutch selectively connecting the input shaft and the first rotating shaft;
a second clutch selectively connecting the input shaft and the fifth rotating shaft;
a third clutch selectively connecting the fourth rotating shaft and the fifth rotating shaft;
a fourth clutch selectively connecting the first rotating shaft and the second rotating shaft;
a fifth clutch selectively connecting the third rotating shaft and the seventh rotating shaft; and
a sixth clutch selectively connecting the fifth rotating shaft and the seventh rotating shaft.

6. The planetary gear train of claim 5, wherein:
in the first planetary gear set, the first rotating element is a first sun gear, the second rotating element is a first planet carrier, and the third rotating element is a first ring gear,
in the second planetary gear set, the fourth rotating element is a second sun gear, the fifth rotating element is a second planet carrier, and the sixth rotating element is a second ring gear, and
in the third planetary gear set, the seventh rotating element is a third sun gear, the eighth rotating element is a third planet carrier, and the ninth rotating element is a third ring gear.

7. The planetary gear train of claim 5, wherein gear shift stages implemented by selectively operating the six clutches include:
a first forward gear shift stage which is implemented by simultaneously operating the first, third, and sixth clutches;
a second forward gear shift stage which is implemented by simultaneously operating the first, fifth, and sixth clutches;
a third forward gear shift stage which is implemented by simultaneously operating the first, fourth, and sixth clutches;
a fourth forward gear shift stage which is implemented by simultaneously operating the first, second, and sixth clutches;
a fifth forward gear shift stage which is implemented by simultaneously operating the second, fourth, and sixth clutches;
a sixth forward gear shift stage which is implemented by simultaneously operating the second, fifth, and sixth clutches;
a seventh forward gear shift stage which is implemented by simultaneously operating the second, fourth, and fifth clutches;
an eighth forward gear shift stage which is implemented by simultaneously operating the first, second, and fifth clutches; and
a reverse gear shift stage which is implemented by simultaneously operating the first, third, and fifth clutches.

8. A planetary gear train of an automatic transmission for a vehicle, the planetary gear train comprising:
an input shaft receiving power from an engine;
an output shaft configured to output power changed in speed;
a first planetary gear set which is a single pinion planetary gear set, and has a first sun gear, a first planet carrier, and a first ring gear;
a second planetary gear set which is a single pinion planetary gear set, and has a second sun gear, a second planet carrier, and a second ring gear;
a third planetary gear set which is a single pinion planetary gear set, and has a third sun gear, a third planet carrier, and a third ring gear;
a first rotating shaft which includes the first sun gear and the third sun gear, and is selectively connected with the input shaft;
a second rotating shaft which includes the first planet carrier and the second ring gear, and is selectively connected with the first rotating shaft;
a third rotating shaft which includes the first ring gear;
a fourth rotating shaft which includes the second sun gear, and is directly connected with a transmission housing;
a fifth rotating shaft which includes the second planet carrier, and is selectively connected with the input shaft and the fourth rotating shaft;
a sixth rotating shaft which includes the third planet carrier, and is directly connected with the output shaft;
a seventh rotating shaft which includes the third ring gear, and is selectively connected with the third rotating shaft and the fifth rotating shaft; and
six control elements which are disposed at positions where the rotating shafts are selectively connected to each other.

9. The planetary gear train of claim 8, wherein the six control elements include:
a first clutch selectively connecting the input shaft and the first rotating shaft;
a second clutch selectively connecting the input shaft and the fifth rotating shaft;
a third clutch selectively connecting the fourth rotating shaft and the fifth rotating shaft;
a fourth clutch selectively connecting the first rotating shaft and the second rotating shaft;
a fifth clutch selectively connecting the third rotating shaft and the seventh rotating shaft; and
a sixth clutch selectively connecting the fifth rotating shaft and the seventh rotating shaft.

10. The planetary gear train of claim 9, wherein gear shift stages implemented by selectively operating the six control elements include:

a first forward gear shift stage which is implemented by simultaneously operating the first, third, and sixth clutches;
a second forward gear shift stage which is implemented by simultaneously operating the first, fifth, and sixth clutches;
a third forward gear shift stage which is implemented by simultaneously operating the first, fourth, and sixth clutches;
a fourth forward gear shift stage which is implemented by simultaneously operating the first, second, and sixth clutches;
a fifth forward gear shift stage which is implemented by simultaneously operating the second, fourth, and sixth clutches;
a sixth forward gear shift stage which is implemented by simultaneously operating the second, fifth, and sixth clutches;
a seventh forward gear shift stage which is implemented by simultaneously operating the second, fourth, and fifth clutches;
an eighth forward gear shift stage which is implemented by simultaneously operating the first, second, and fifth clutches; and
a reverse gear shift stage which is implemented by simultaneously operating the first, third, and fifth clutches.

* * * * *